US008760670B2

(12) United States Patent
Ulichney et al.

(10) Patent No.: US 8,760,670 B2
(45) Date of Patent: Jun. 24, 2014

(54) SYSTEM AND METHOD FOR PRINT PRODUCTION SHEET IDENTIFICATION

(75) Inventors: Robert Ulichney, Stow, MA (US);
Matthew Gaubatz, Ithaca, NY (US);
David Rouse, Ithaca, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1301 days.

(21) Appl. No.: 12/572,131

(22) Filed: Oct. 1, 2009

(65) Prior Publication Data

US 2011/0080607 A1    Apr. 7, 2011

(51) Int. Cl.
*G06K 15/00*    (2006.01)

(52) U.S. Cl.
USPC ......... 358/1.12; 358/504; 358/1.15; 358/474; 358/518; 358/1.9; 358/1.18; 358/3.27; 358/3.26; 358/497; 358/498; 399/395; 399/361; 399/16; 347/19

(58) Field of Classification Search
CPC .. H04N 1/6038; H04N 1/6041; H04N 1/6044
See application file for complete search history.

(56) References Cited

U.S. PATENT DOCUMENTS

| | | | |
|---|---|---|---|
| 6,441,923 B1 * | 8/2002 | Balasubramanian et al. | 358/3.23 |
| 6,459,509 B1 * | 10/2002 | Maciey et al. | 358/474 |
| 7,391,525 B2 * | 6/2008 | Chapman et al. | 358/1.12 |
| 8,649,076 B2 * | 2/2014 | Majewicz | 358/509 |
| 2002/0080427 A1 * | 6/2002 | Clifton | 358/505 |
| 2003/0161016 A1 * | 8/2003 | Abhyankar et al. | 358/539 |
| 2004/0042021 A1 * | 3/2004 | Wu et al. | 358/1.9 |
| 2004/0179217 A1 * | 9/2004 | Chapman et al. | 358/1.12 |
| 2005/0151985 A1 * | 7/2005 | Hisamura | 358/1.12 |
| 2005/0219590 A1 * | 10/2005 | Andersen et al. | 358/1.12 |
| 2006/0212805 A1 * | 9/2006 | Allen et al. | 715/520 |
| 2007/0024657 A1 * | 2/2007 | Zhang et al. | 347/19 |
| 2009/0027705 A1 * | 1/2009 | Ozaki et al. | 358/1.9 |
| 2009/0086234 A1 * | 4/2009 | Oles | 358/1.9 |
| 2011/0026087 A1 * | 2/2011 | Majewicz | 358/509 |

* cited by examiner

*Primary Examiner* — Hilina K Demeter

(57) ABSTRACT

A system and method is disclosed for print production sheet identification. The method discloses: receiving a set of calibration sheets; collecting an array of pixel samples from at least one of the calibration sheets according to a set of pixel sampling rules to generate at least one reference sample array; capturing an image of a set of physical sheets generated from the set of calibration sheets; collecting an array of pixel samples from at least one of the imaged physical sheets according to the set of pixel sampling rules to generate at least one post-processing sample array; and comparing the post-processing sample array to the reference sample array to determine if the two arrays have less than or equal to a predetermined number of differences. The system discloses: a sampling module, operated by a processor, a scanner, and a comparison module, operated by a processor.

20 Claims, 4 Drawing Sheets

SYSTEM AND METHOD FOR PRINT PRODUCTION SHEET IDENTIFICATION

BACKGROUND OF THE INVENTION

1. Field of the Invention

The present invention relates generally to systems and methods for print production, and more particularly to sheet identification in print production.

2. Brief Background Introduction

Modern print production systems and methods involve the printing, collation, and binding of thousands upon thousands of pages having text, charts, tables, photos, etc., with many different finishing techniques including gloss, matte, flat, etc., and on a variety of card stock sheets having various colors, thicknesses and sizes. For all of these variables to correctly come together to yield a finished book, document, and the like requires that each physical sheet in a print production setting be monitored and located at various stages during the production process.

BRIEF DESCRIPTION OF THE DRAWINGS

Some embodiments of the invention are described, by way of example, with respect to the following figures.

DETAILED DESCRIPTION OF THE PREFERRED EMBODIMENT

Figure 1:
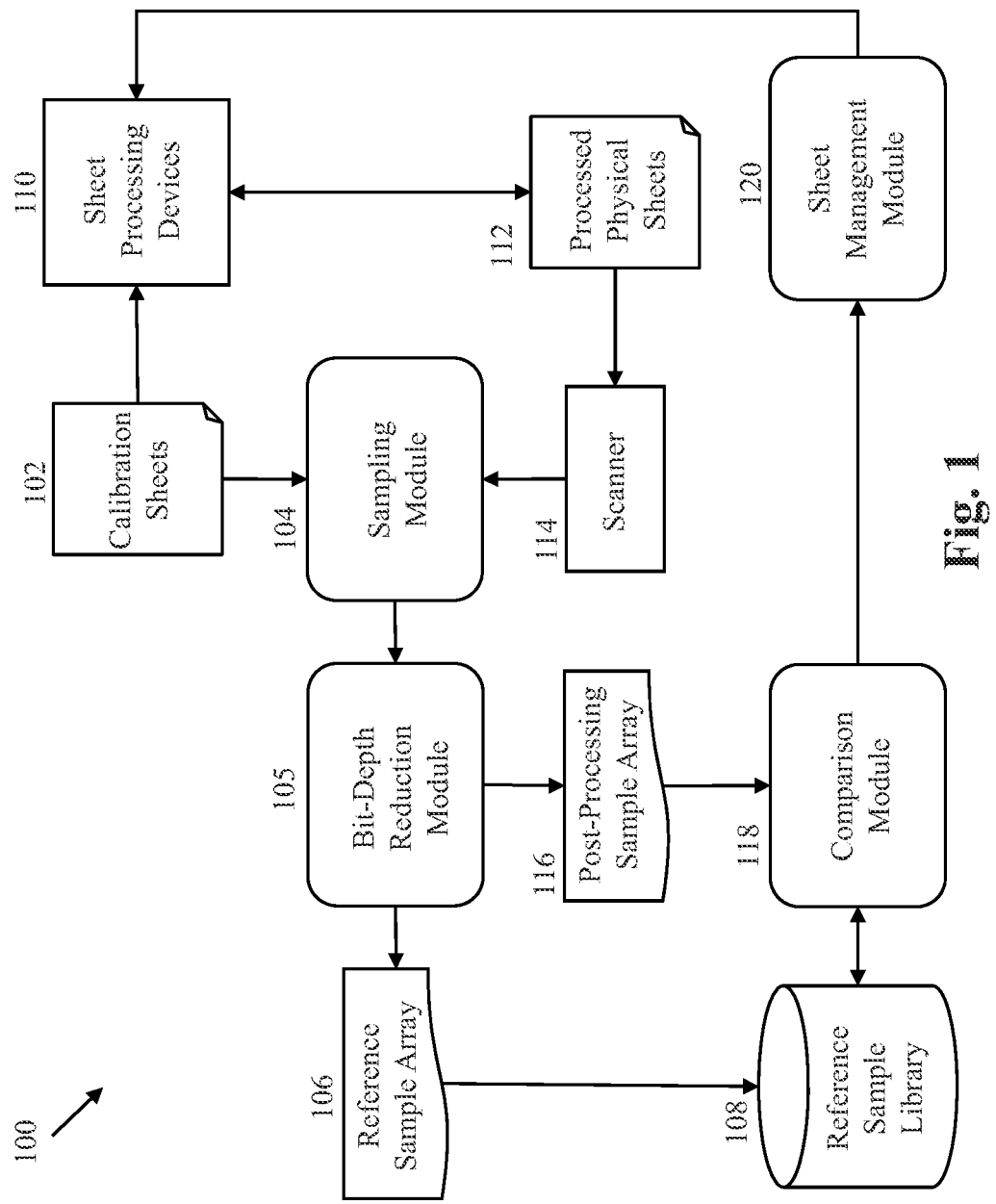
FIG. 1 is a dataflow diagram of one embodiment of a system for print production sheet identification.

Current print production systems and methods, however, often require human intervention to manually route pages through a sequence of production devices to create a finished product. For example, currently when color inserts must be added to a non-color document, the color inserts must be manually inserted at the right document page during the print production process. The cost associated with this labor is a significant part of a print production house's operating budget.

In response, some techniques have been employed or suggested for physically tracking pages, sheets, images, and the like during the print production process. One approach identifies pages by adding overt marks to each sheet, page, image, etc. A costly drawback to this approach, however, is that the overt markings must then be removed from the page, requiring the addition of an expensive and time consuming cutting stage into the print production workflow.

A second approach for page matching text documents employs a six page segmentation algorithm for text documents with Manhattan layouts (e.g., documents whose layouts can be defined by zones represented by rectangles) and non-Manhattan layouts. In this evaluation the authors provide recommendations for pairing the algorithms tested with particular applications and document types, however the six segmentation technique is limited to text documents rather than general commercial pages. See F. Shafait, et al., "*Performance evaluation and benchmarking of six page segmentation algorithms,*" *IEEE Trans. on Pattern Analysis and Machine Intelligence*, vol. 30, no. 6, pp. 941-954, 2008.

Another suite of techniques involve region-based image-to-image comparisons where the performance of six region detectors are tested when used in combination with a descriptor from a scale-invariant feature transform. These techniques are categorized as edge-based comparisons, region-based comparisons, and layout-base comparisons. These techniques, however, are unsuitable for the high speed problem due to the multi-pass complexity of the algorithms and the expectation that full resolution data is used. Also the "image subtraction" used in some of the techniques does not work if the images to be compared are even minimally "offset". See, K. Mikolajczyk, et al., "*A comparison of affine region detectors,*" *Int. Journal of Computer Vision*, vol. 65, no. 1/2, pp. 43-72, 2005.

In response to the concerns discussed above, what is needed is a system and method for print production sheet identification that overcomes these problems.

The present invention embodies a page identification system and method within a print production system and method which is capable of matching a minimal resolution scanned version of an incoming physical page to either an original electronic RIP version of the physical page, or an earlier scanned version of the physical page, using the information already on the page and without adding any extra ink to the page. Since there are no extra ink marks on the physical page, there is no need to trim such overt marks from the page.

The present invention, in one embodiment, uses a sampling process to generate a minimal resolution representation of each physical page at various stages of the print production process, which are then matched to earlier generated minimal resolution versions of the physical page. In some embodiments, an entire physical page can be reduced to a sample set which can be entirely loaded into one CPU register such that the page matching comparisons can be made using just a single XOR instruction followed by a population instruction. This two instruction simplicity makes page matching extremely fast, and thus well suited for the high-speed, high data-rate environment of commercial print production, and the present invention requires only a very minimal data bandwidth from the physical page scanning device.

Other benefits and advantages of the present invention include application to any type of page image, going well beyond just text matching. The present invention also tolerates varying degrees of "motion blur" yielding little change in performance, even at low resolutions. "Full resolution images" of pages are also not required, thereby further increasing print production throughput speed. Other approaches which do not include the present invention are orders of magnitude more complex and require much more sampling.

The present inventions high throughput speed enables a host of new highly automated applications in the print production environment as well. These include: page "insertion" from an alternate-sources (e.g. different printing processes); page and sheet routing within a print production environment; enabling protocols that maximize resource usage (e.g. printers, and finishers) using job multiplexing so that multiple jobs may be processed in parallel; and enabling protocols, such as "Job Definition Format (JDF) compliance standards", for assuring that a print job is correctly processed and completed.

More specifically, when the present invention is used in a "Distributed Printing Model", the high speed page identification enables pages to be routed between a variety of "finishing equipment" including: page insertion devices, page coating devices, page trimmers, and binding machines.

When the present invention is used for implementing "JDF-compliance standards", the life cycle of a print job may be accurately monitored with what is called an "electronic job jacket" which defines key steps in the print production workflow, including: processing instructions associated with each job (called a "ticket"); signals to "begin job processing"; and signals indicating that "job processing is complete". Details of the present invention are now discussed.

Figure 2:
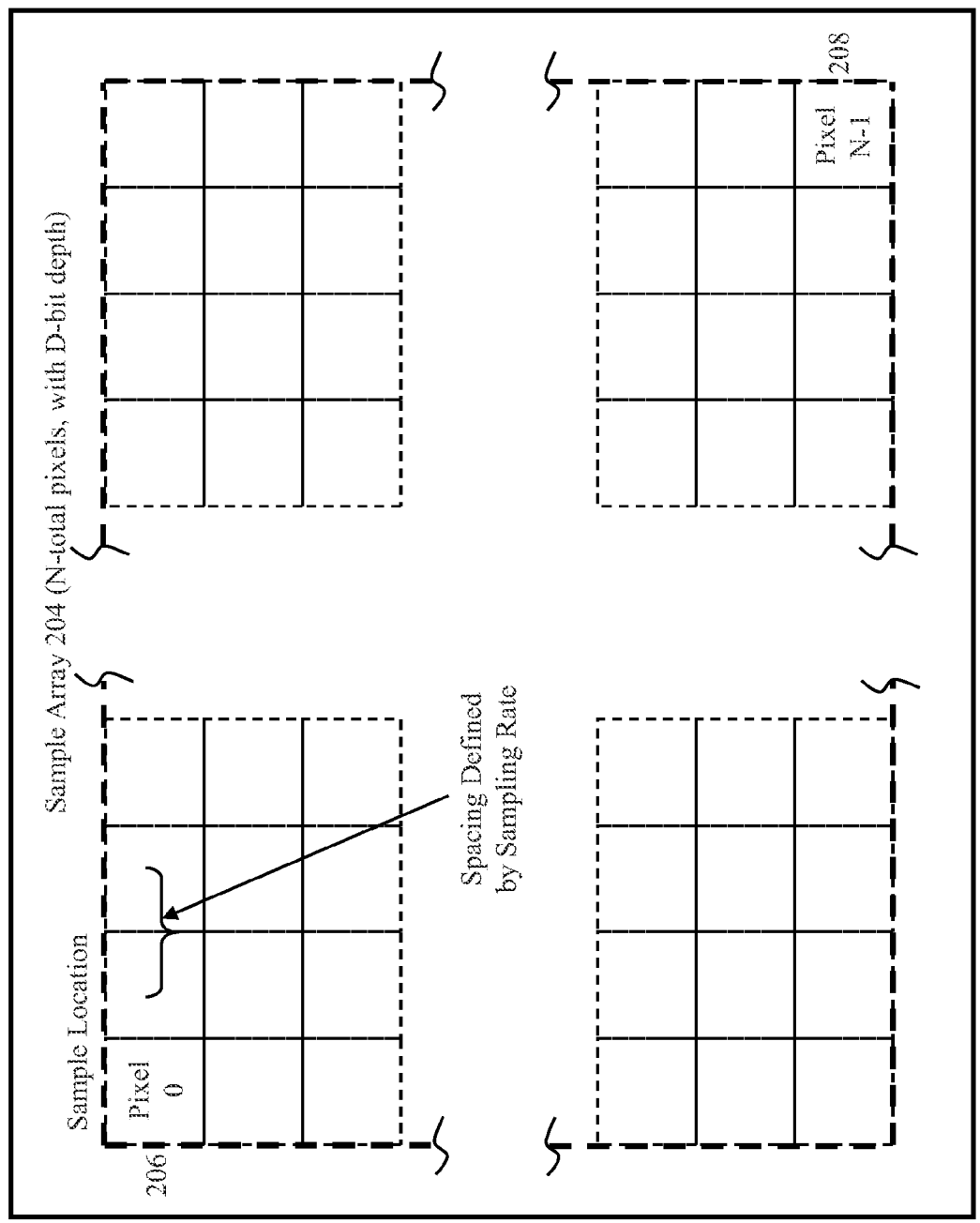
FIG. 2 is a pictorial diagram of one embodiment of a sheet processed by the system.
Figure 3:
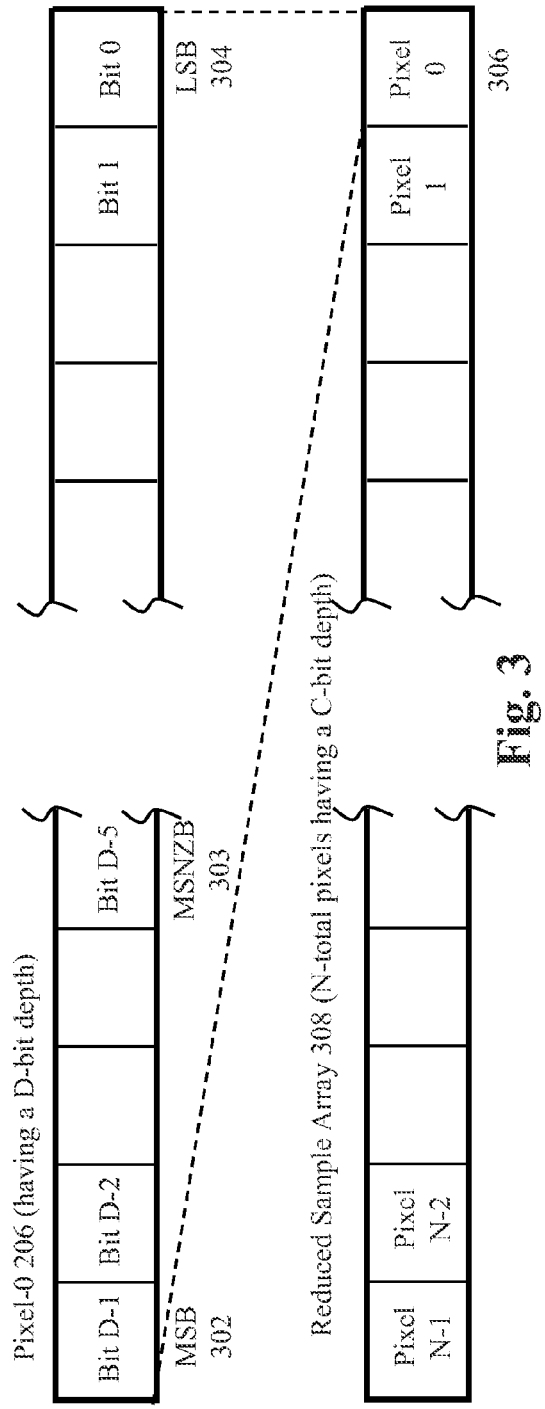
FIG. 3 is a data structure diagram of one embodiment of reducing pixel bit-depth within the system.
Figure 4:
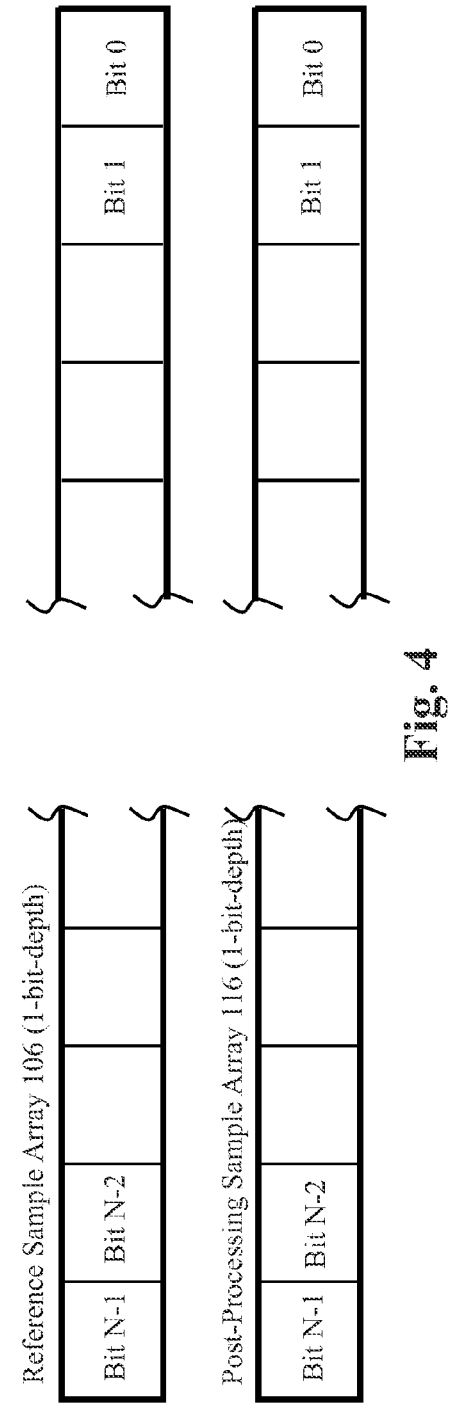
FIG. 4 is a data structure diagram of one embodiment of a 1-bit-depth XOR comparison within the system.

FIG. 1 is a dataflow diagram of one embodiment of a system 100 for print production sheet identification. FIG. 2 is a pictorial diagram of one embodiment of a sheet 202 processed by the system. FIG. 3 is a data structure diagram of one embodiment of reducing pixel bit-depth within the system 100. FIG. 4 is a data structure diagram of one embodiment of a 1-bit-depth XOR comparison within the system 100. To facilitate understanding, FIGS. 1 through 4 are discussed together.

To begin, a sampling module 104, within the system 100, receives a set of calibration sheets 102. In one embodiment of the present invention, the calibration sheets 102 represent a portion of a print production job (e.g. print job) being processed by the system 100.

The calibration sheets 102 can be in a variety of formats including: electronic, logical; and physical. For example, the calibration sheets 102 can be: an application file in a .pdf, .doc, .xls, and etc. format; a RIP file, ready for printing; or a set of physical sheets which have just been scanned. However, in many embodiments of the invention, the calibration sheets 102 will be in a RIP file format right before being sent for subsequent processing (e.g. printing, rendering, etc.). The calibration sheets 102 may also be accompanied by an "electronic job jacket", perhaps following a "Job Definition Format" (JDF) standard, which defines a set of rendering, processing, finishing steps, and a completion status within the print production workflow.

A "physical sheet", within the calibration sheets 102, is herein defined broadly to include a platform (e.g. piece of paper, cardstock, vellum, plastic, etc.) formatted to hold one or more pages of text, photos, tables, pictures, and such, which in many embodiments of the present invention, will later be bound with other "physical sheets" into a handout, a book, or another physical, tangible embodiment.

The calibration sheets 102 are used by the system 100 as a "reference point" (e.g. a fingerprint) for subsequent sheet identification, tracking, routing, and finishing steps in the print production workflow. FIG. 2 shows an example sheet 202 which can either be a logical representation of a RIP file, or an actual "physical sheet".

The sampling module 104 next accesses a table (not shown) having a set of pixel sampling rules corresponding to different types of calibration sheets 102. The pixel sampling rules include: a sampling region, a sampling rate, and a pixel bit-depth, which the sampling module 104 uses to collect an array of samples, such as the sample array 204 shown in FIG. 2.

The "sampling region" specifies an area on (i.e. subset of) each sheet 102 which is to be sampled. The sampling region can be based on known information about the calibration sheets 102, including: blank margin regions, number of pages per sheet, and areas having a greatest degree of uniqueness which differentiates one sheet from another. The benefit of specifying a sampling region is reducing a number of pixels to be collected from the calibration sheets 102, while still maintaining a high sheet/page identification rate. FIG. 2, shows an example "sampling region" bounded by the bold-dashed-lines on the sheet 202. In another embodiment, the sheet could be an 8.5 inch by 11 inch sheet of paper, and the sampling region is an 8 inch by 10 inch region containing text, photos, tables, etc. but does not include a 0.25 inch margin at either end of the shorter 8.5 inch width, nor a 0.5 inch margin at either end of the longer 11 inch length.

The "sampling rate", in the pixel sampling rules, specifies the granularity how information associated with groups of pixels will be collected within the sampling region. In some sampling schemes, the sampling rate specifies a spacing (i.e. frequency) of collecting pixels within the sampling region, possibly parameterized by the number of collected samples per inch (in each dimension). The sheet 202 in FIG. 2 includes a distance between collected samples, as shown by the bracket, that is associated with the sampling rate. On this example sheet 202 a set of "N" pixels (i.e. pixel-0 206 through pixel-(N−1) 208) have been collected by the sampling module 104. Or in the 8 inch by 10 inch embodiment above, a sampling rate yielding one collected pixel per inch could be specified, resulting in 80 pixels being collected for the sheet 202.

The "pixel bit-depth", in the pixel sampling rules, specifies a sampling bit-depth for each pixel which samples the calibration sheet 102. FIG. 3, shows an example "D-bit-depth" for pixel-0 206 in the sample array 204 of FIG. 2. "D" can be of any size, but is commonly 8, 16, or 32 bits currently.

By varying the sampling region, sampling rate, and pixel bit-depth, within the pixel sampling rules, the sampling module 104 can be "tuned" to optimize system 100 "page identification accuracy" and "sheet/page throughput speed".

The pixel sampling rules may also include a variety of other attributes which control the operation of the sampling module 104 and optimization of the system 100, as is discussed elsewhere in this specification.

Next, a bit-depth reduction module 105 optionally reduces the original "pixel bit-depth" captured by the sampling module 104 to a reduced pixel bit-depth to generate a reference sample array 106, for each of the calibration sheets 102.

Each reference sample array 106 is a lower resolution electronic representation of one of the calibration sheets 102. Operation of the bit-depth reduction module 105 is identified as "optional", since the sampling module 104 has already reduced the resolution of the calibration sheets 102 according to the pixel sampling rules discussed above. Thus in an embodiment of the present invention where bit-depth reduction is not to be effected, the reference sample array 106 becomes the D-bit depth sample array 204 (see FIG. 2) collected by the sampling module 104. The reference sample array 106 is then stored in a reference sample library 108.

However, in other embodiments of the present invention, the bit-depth reduction module 105 is used to generate a C-bit-depth reduced sample array 308 (see FIG. 3) from the D-bit-depth sample array 204 (see FIG. 2). For example, pixel-0 206 in FIG. 2 was captured with a D-bit-depth as shown in the top portion of FIG. 3. The bit-depth reduction module 105 reduces the D-bit depth pixel-0 206 to a C-bit-depth reduced pixel-0 306 in the reduced sample array 308 shown in the lower portion of FIG. 3. Note that the total number of pixels "N" has not changed between the reduced sample array 308 and the sample array 204 of FIG. 2, but the bit-depth of each pixel in the sample array 204 has been reduced from "D" bits to "C" bits.

Benefits, of such a further reduction in the resolution of the calibration sheets, include an even higher throughput with in the system 100 for page identification. As a general rule, the higher the throughput of a print production system, the greater value the system has.

The bit-depth reduction module 105 reduces the "pixel bit-depth" in accordance with a set of threshold criteria and techniques. The threshold criteria and techniques specify a set of print production derived rules for judiciously reducing the bit-depth of a pixel, while preferably retaining a greatest amount of differentiating information. For example, if a 32-bit pixel is to be reduced to an 8-bit pixel, and information on the color gamut of the calibration sheets 102 is available, then a set of thresholds can be programmed into the bit-depth reduction module 105 such that a greatest amount of color gamut can be preserved, even after the reduction in pixel bit-depth.

Thus techniques used by the bit-depth reduction module 105 can be varied, and while several techniques will now be discussed, those skilled in the art will recognize that many other bit-depth reduction techniques may be used as well.

However, to maximize the throughput speed of the present invention, for a given set of pixel sampling rules, while preserving a high sheet identification and matching rate, the bit-depth reduction module 105 preferably employs a bit-depth reduction technique which reduces the "pixel bit-depth" of the pixels in the sample array 204 to 1-bit. Such a reduction of the "bit-depth" to 1-bit is called a "binarization threshold technique". Such "binarization threshold techniques" include: an "MSB threshold technique", a "Midpoint threshold technique", and a "Mean threshold technique". These three techniques are now discussed in the context of FIGS. 2 and 3.

Using the "MSB (Most Significant Bit) threshold technique", the bit-depth reduction module 105 retains only bit D-1 of each D-bit pixel value. In cases where the greatest bits are all zero (including the MSB 302), variations on this approach may be more appropriate. The "Most Significant Non-zero Bit" (MSNZB 303) represents the greatest bit of all N D-bit pixel values that is non-zero. For example in FIG. 3, pixel-0 206 Bit D-5 is presumed to have a "1", but Bits D-1, D-2, D-3, and D-4 may be all "zeros" for all of the pixels (i.e. pixel-0 206 through pixel-(N−1) 208) in the sample array 204, thus Bit D-5 is the MSNZB 303, as shown. MSNZB 303 represents the "threshold", and thus each pixel in the sample array 204 having a "1" in the identified MSNZB bit location has its corresponding 1-bit-depth pixel value in the reduced sample array 308 set equal to "1" by the bit-depth reduction module 105. Similarly, each pixel in the sample array 204 having a "0" in the identified MSNZB bit location has its corresponding 1-bit-depth pixel value in the reduced sample array 308 set equal to "0".

Using the "Midpoint threshold technique", the bit-depth reduction module 105 identifies a maximum and minimum pixel value within all of the N D-bit-depth pixels of the sample array 204. A "mid-point" value is then defined as a value halfway between the identified maximum and minimum pixel values. Each pixel in the sample array 204 having a value equal to or greater than the "mid-point" value has its corresponding 1-bit-depth pixel value in the reduced sample array 308 set equal to "1" by the bit-depth reduction module 105. Similarly, each pixel in the sample array 204 having a value less than the "mid-point" value has its corresponding 1-bit-depth pixel value in the reduced sample array 308 set equal to "0".

Using the "Mean threshold technique", the bit-depth reduction module 105 sums all of the N pixel values in the sample array 204. The bit-depth reduction module 105 then divides the summation by "N" to obtain the "average" value of all of the N D-bit-depth pixels. This "average" is the "mean" value. Each pixel in the sample array 204 having a value equal to or greater than the "mean" value has its corresponding 1-bit-depth pixel value in the reduced sample array 308 set equal to "1" by the bit-depth reduction module 105. Similarly, each pixel in the sample array 204 having a value less than the "mean" value has its corresponding 1-bit-depth pixel value in the reduced sample array 308 set equal to "0". At the time this specification was drafted, the "Mean threshold technique" was preferred.

The bit-depth reduction module 105 then stores the reference sample array 106 in the reference sample library 108.

Next, just as the sampling module 104 received the set of calibration sheets 102, as discussed above, so too does a set of sheet processing devices 110. The sheet processing devices 110 are herein defined to include one or more devices for processing (e.g. rendering, printing, tracking, cutting, finishing, coating, sorting, collating, etc.) the calibration sheets 102, possibly in accordance with a set of print production instructions in an "electronic job jacket" associated with the calibration sheets 102. In a first instance, a first subset of the sheet processing devices 110 will receive the calibration sheets 102 in a RIP format and begin generating a corresponding set of processed physical sheets 112. These physical sheets 112 are in most cases then passed between (e.g. routed from) the first subset of the sheet processing devices 110 and (e.g. routed to) a second subset of the sheet processing devices 110, which will effect even further "processing" of the physical sheets 112, as implied by the double arrow line between the sheet processing devices 110 and the physical sheets 112. The example sheet 202 in FIG. 2 is a representative image of one or more of these physical sheets 112.

A scanner 114 scans/captures an image of one or more of the physical sheets 112 after one or more of the sheet processing devices 110 has completed a processing function on the one or more of the physical sheets 112. Typically, additional scanners (not shown) are added to scan/capture images of various subsets of the physical sheets 112 and at various physical locations within a print production facility, so as provide the system 100 with an ability to monitor and manage the entire print production workflow. Such additional scanners are preferably located either before or after key sheet routing, cutting, collation, and finishing steps effected by the sheet processing devices 110.

The sampling module 104 receives the scanned physical sheets 112. The sampling module 104 uses the pixel sampling rules (discussed above) to process the physical sheets 112 and thereby generate a corresponding set of sample arrays 204, in a manner similar to how the sampling module 104 processed the calibration sheets 102 (also discussed above).

Next, the bit-depth reduction module 105 optionally reduces the original "pixel bit-depth" captured by the sampling module 104 to a reduced pixel bit-depth to generate a post-processing sample array 116, corresponding to each of the physical sheets 112, and in a manner similar to how the calibration sheets 102 were processed, as was discussed earlier in this specification. This similarity includes employing a bit-depth reduction technique which reduces the "pixel bit-depth" of the pixels in the sample array 204, which was obtained from the physical sheets 112, to 1-bit. Pixel reduction to 1-bit also helps maximize the throughput speed of the present invention, as will be further discussed.

In a alternate embodiment of the system 100, the sampling module 104 and the bit-depth reduction module 105 can be reprogrammed to interpret "a particular subset of the scanned physical sheets 112 received from a particular scanner" as the set of calibration sheets 102, and thereby generate a corresponding set of reference sample arrays 106 to be stored in the reference sample library 108. In this way the print production sheet identification functionality can be effectively turned on or off at different stages, portions, etc. of the print production workflow.

A comparison module 118 receives the post-processing sample array 116 corresponding to one of the scanned physical sheets 112, as shown in the lower portion of FIG. 4. The comparison module 118 then retrieves one or more of the reference sample arrays 106, as shown in the top portion of FIG. 4, from the reference sample library 108. The comparison module 118 compares the post-processing sample array 116 to each of the reference sample arrays 106 using a "sum-squared-errors (SSE) technique" until a suitable "match" is identified.

"Match" is herein defined as a comparison result wherein the arrays 116 and 106 have less than or equal to a predetermined number of differences, and does not require that the two arrays be identical. In one embodiment of the present invention, the predetermined number of differences is equal to a smallest number of differences, once the post-processing sample array 116 has been compared to more than one of the reference sample arrays 106. "Differences" between the two arrays 116 and 106 can also be thought of as a "distance" between the two arrays. Thus, the "better the match" between the two arrays, the "lower" the distance value, whereas the "worse the match" between the two arrays, the "greater" the distance value.

The post-processing sample array 116 is a nearly real-time snapshot of a particular physical sheet 112 being processed within the print production system. Due to the nature of the print production workflow, specific identification of each physical sheet 112 is highly desired, and often required, to ensure that the print production product meets certain quality standards. Comparing the post-processing sample array 116 to the reference sample array 106, which was derived from the original fingerprint (i.e. reference point) of the calibration sheets 102, thus provides a proper touchstone for uniquely identifying each of the physical sheets 112.

For sample array 106 and 116 bit-depths greater than 1-bit, one embodiment of the sum-squared-errors comparison is as follows:

Set <total>=0
For each pixel <p> in one sample array, and each corresponding pixel <p'> in the other sample array, set
<total>=<total>+(p−p')*(p−p')
End
Note: <total> is a total number of "differences" between the compared pixel sample arrays 106 and 116. The lower the value of <total>, then the more similar (i.e. better match) the two sample arrays are.

The above calculation is advantageous because it is fast. However, another more general method is to compute the following:

Set <total>=0
For each pixel <p> in one sample array and each corresponding pixel <p'> in the other sample array, set
<total>=<total>+|p−p'|^q
End
Note: <q> is some real number greater than 0.

For sample array 106 and 116 bit-depths of 1-bit (see FIG. 4) a very simple and very fast sum-squared-errors comparison can be employed which uses an XOR operation to compare the pixel sample arrays, and a "population count" operation to "total" a number of "differences" between the compared pixel sample arrays 106 and 116. This embodiment of the sum-squared-errors comparison is as follows:

Set <total>=0
For each pixel <p> in one sample array and each corresponding pixel <p'> in the other sample array, set
<total>=<total>+XOR(p,p')
End The XOR operation outputs a "1" state for each 1-bit pixel difference detected during the pixel-by-pixel sample arrays comparison; and the "population count" totals a number of these differences between the arrays.

Use of the 1-bit-depth sample arrays 106 and 116, and the XOR and "population count" operations are preferred because they eliminate the complexity of using standard "multiplication" operations to compute the sum-squared-errors calculation. Such a simplification in the operation of the comparison module 118 increases the speed of the system 100 and thus the throughput of the print production workflow.

The comparison module's 118 speed can be further increased if the total number of bits "N" in the reduced sample array 308 (i.e. the reference sample array 106 and the post-processing sample array 116 as well) can fit into a single "register" of a computational device (e.g. a computer) which is used to perform the XOR comparison. For example, if a computer effecting the present invention has a 64-bit register, then the sample array's size 106 and 116 is also preferably 64-bits, so that the XOR comparison between the two sample arrays 106 and 116 can be computed in a fewer number of steps.

In one embodiment of the present invention using 1000 sample sheets which were chosen to test the robustness of the present invention, a nearly 100% correct match rate was observed using the sum-squared-errors calculation with 4-bit-depth pixels, spaced at 8 pixels per inch. A similarly high nearly 100% correct match rate was also observed using the sum-squared-errors XOR calculation with 1-bit-depth pixels, spaced at 1 pixel per inch.

After performing the comparison, the comparison module 118, in one embodiment of the present invention, outputs a "match" or "not match" signal. However in another embodiment of the present invention, the comparison module 118 could output a "distance value", wherein the "better the match" the "lower" the distance value, and the "worse the match" the "higher" the distance value. The distance value would correspond to the value of the <total> variable.

In an alternate embodiment of the present invention, the comparison module 118 uses a "measurement of correlation technique" instead of a "sum-squared-errors technique". The "measurement of correlation" calculation is computed as follows:

Set <total>=0
Initialize <offset>, <offset'>
For each pixel <p> in one sample array and each corresponding pixel <p'> in the other sample array, set
<total>=<total>+(p−offset)*(p'−offset')
End
Next, where the reduced resolution data is C-bit pixel values, set <total>=1−<total>/(((2^C)−1)*((2^C)−1)*# of pixels in an sample array)
Typically, <offset> and <offset'> are either set to <0>, or the respective average (i.e. mean) pixels values of each C-bit sample array. Note that the "mean" can be replaced by either the "midpoint" of the values or by 2^(C−1).

An optional sheet management module 120 can be used to create a "closed-loop" feedback path to the sheet processing devices 110 or other elements in the system 100 (not shown) which can be used to identify additional processing steps (e.g. finishing steps) for certain subsets of the physical sheets 112 or to effect JDF compliance functions, as introduced earlier in this specification.

Figure 5:
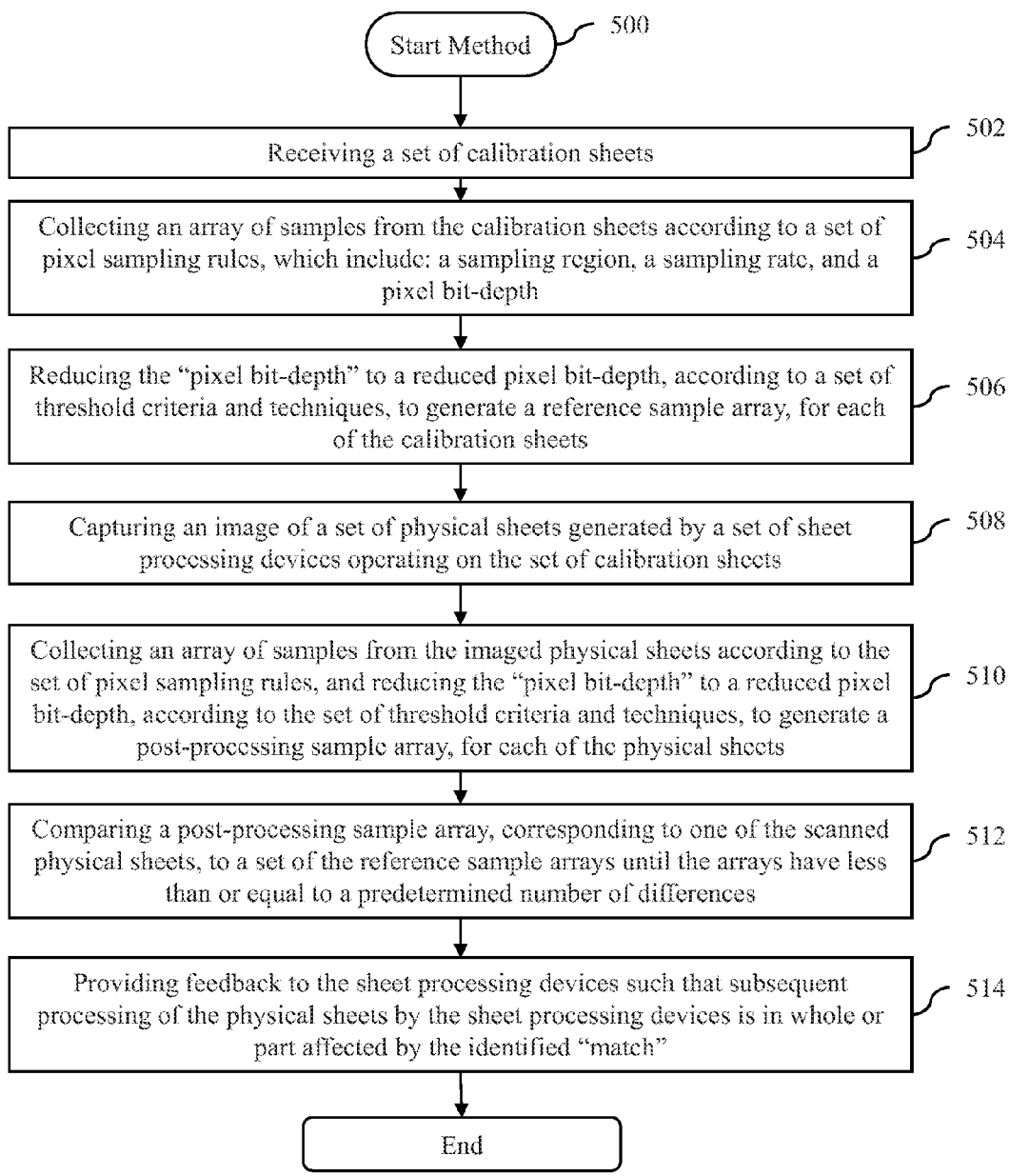
FIG. 5 is a flowchart of one embodiment of a method for sheet identification in print production.

Operation and page matching accuracy of the comparison module 118 can be also enhanced by leveraging:

information regarding a known contiguous sequence of physical sheets (e.g. physical sheets would always arrive at the scanner 114 in a particular order);

"identifying" (using the comparison module 118) only a first arriving sheet in a known contiguous sequence of sheets and processing the remaining sheets in the known contiguous sequence in accordance with the electronic job jacket, without separately "identifying" them;

known sheet fonts, orientation, and/or content complexity;

information on a number of sheets still remaining unidentified within a finite sheet domain (e.g. can use process of elimination to help identify physical sheets);

FIG. 5 is a flowchart of one embodiment of a method 500 for sheet identification in print production. Those skilled in the art will recognize that while one embodiment of the present invention's method is now discussed, the material in this specification can be combined in a variety of ways to yield other embodiments as well. The method steps next discussed are to be understood within a context provided by this and other portions of this detailed description.

The method 500 begins in step 502, where the sampling module 104, receives a set of calibration sheets 102. Next, in step 504, the sampling module 104 collects an array of samples from the calibration sheets 102 according to a set of pixel sampling rules, which include: a sampling region, a sampling rate, and a pixel bit-depth. In step 506, the bit-depth reduction module 105 optionally reduces the original "pixel bit-depth" captured by the sampling module 104 to a reduced pixel bit-depth, in accordance with a set of threshold criteria and techniques, to generate a reference sample array 106, for each of the calibration sheets 102.

The method 500 continues with step 508 where a scanner 114 captures an image of one or more of physical sheets 112 generated by a set of sheet processing devices 110 operating on the set of calibration sheets 102. In step 510 the sampling module 104 collects an array of samples from the imaged physical sheets according to the set of pixel sampling rules, and the bit-depth reduction module 105 optionally reduces the "pixel bit-depth" to a reduced pixel bit-depth, according to the set of threshold criteria and techniques, to generate a post-processing sample array 116, for each of the physical sheets 112.

In step 512, the comparison module 118 compares the post-processing sample array 116, corresponding to one of the scanned physical sheets 112, to a set of the reference sample arrays 106, using either a "sum-squared-errors (SSE) technique", a "1-bit XOR technique", measurement of correlation technique, or some other comparison technique, until a suitable "match" is identified. Then in step 514, an optional sheet management module 120 provides feedback to the sheet processing devices 110 such that subsequent processing of the physical sheets 112 by the sheet processing devices 110 is in whole or part affected by the identified "match".

A set of files refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Instructions of software described above are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. A method, executed by a computer, for print production sheet identification, comprising:
   receiving a set of calibration sheets;
   collecting an array of pixel samples from at least one of the calibration sheets according to a set of pixel sampling rules to generate at least one reference sample array;
   capturing an image of a set of physical sheets generated from the set of calibration sheets;
   collecting an array of pixel samples from at least one of the imaged physical sheets according to the set of pixel sampling rules to generate at least one post-processing sample array;
   comparing the post-processing sample array to the reference sample array to determine if the two arrays have less than or equal to a predetermined number of differences;
   in response to determining that the two arrays have less than or equal to the redetermined number of differences, identifying the set of physical sheets as the set of calibration sheets; and
   in response to determining that the two arrays do not have less than or equal to the redetermined number of differences, identifying the set of physical sheets as not the set of calibration sheets.

2. The method of claim 1, wherein the pixel sampling rules include:
   a pixel bit-depth.

3. The method of claim 2, further comprising:
   reducing the "pixel bit-depth" of the calibration sheets and the imaged physical sheets to a reduced pixel bit-depth, according to a set of threshold criteria and techniques.

4. The method of claim 3, wherein threshold criteria and techniques include:
   a MSNZB (Most Significant Non Zero Bit) threshold technique which identifies a MSNZB within a subset of bits within the array of pixel samples and replaces said subset of bits with one state if the subset of bits are greater than or equal to the MSNZB, and replaces said subset of bits with another state if the subset of bits are less than the MSNZB.

5. The method of claim 3, wherein threshold criteria and techniques include:
a Midpoint threshold technique which identifies a bit value halfway between a maximum and minimum bit value within a subset of bits within the array of pixel samples and replaces said subset of bits with one state if the subset of bits are greater than or equal to the halfway value, and replaces said subset of bits with another state if the subset of bits are less than the halfway value.

6. The method of claim 3, wherein threshold criteria and techniques include:
a Mean threshold technique which calculates an average bit value within a subset of bits within the array of pixel samples and replaces said subset of bits with one state if the subset of bits are greater than or equal to the average value, and replaces said subset of bits with another state if the subset of bits are less than the average value.

7. The method of claim 3,
wherein the "pixel bit-depth" is reduced to 1-bit.

8. The method of claim 1,
wherein the set of physical sheets are generated by a set of sheet processing devices operating on the set of calibration sheets.

9. The method of claim 1, wherein comparing includes:
comparing the post-processing sample array to each of several reference sample arrays, each corresponding to a different one of the calibration sheets,
until the arrays have a smallest number of differences.

10. The method of claim 1, wherein comparing includes:
comparing the post-processing sample array to the reference sample array using one technique from a group including: a sum-squared-errors technique, an XOR-based sum-squared-errors technique, and a measurement of correlation technique.

11. The method of claim 10,
wherein the pixel sampling rules include a pixel bit-depth equivalent to 1-bit; and
wherein comparing using the XOR-based sum-squared-errors technique includes:
comparing corresponding bits between each of the arrays using an XOR operation;
counting the XOR'd bits using a population count operation; and
identifying the reference sample array as similar to the post-processing sample array if the population count total is less than or equal to the predetermined number of differences.

12. The method of claim 11, further comprising:
sizing the arrays to individually fit into a computational register within a computational device; and
executing the XOR operation using the computational register.

13. The method of claim 1, wherein comparing includes:
outputting one from a group including: a match signal if the arrays have less than or equal to the predetermined number of differences, a not match signal if the arrays have more than the predetermined number of differences, and a distance value equaling the predetermined number of differences.

14. The method of claim 1,
wherein comparing includes, comparing a first post-processing sample array, within a set of contiguous post-processing sample arrays, to each of several reference sample arrays, until a first reference sample array is identified as have less than or equal to the predetermined number of differences than the first post-processing sample array; and
further comprising identifying a set of contiguous reference sample arrays, beginning with the first reference sample array and having a same set size as the set of contiguous post-processing sample arrays, as corresponding the set of contiguous post-processing sample arrays.

15. An article comprising at least one non-transitory computer-readable storage medium containing computer instructions for print production sheet identification, further comprising:
receiving a set of calibration sheets;
collecting an array of pixel samples from at least one of the calibration sheets according to a set of pixel sampling rules to generate at least one reference sample array;
capturing an image of a set of physical sheets generated from the set of calibration sheets;
collecting an array of pixel samples from at least one of the imaged physical sheets according to the set of pixel sampling rules to generate at least one post-processing sample array;
comparing the post-processing sample array to the reference sample array to determine if the two arrays have less than or equal to a predetermined number of differences;
in response to determining that the two arrays have less than or equal to the redetermined number of differences, identifying the set of physical sheets as the set of calibration sheets; and
in response to determining that the two arrays do not have less than or equal to the redetermined number of differences, identifying the set of physical sheets as not the set of calibration sheets.

16. A system for print production sheet identification, comprising:
a sampling module, operated by a processor, for: receiving a set of calibration sheets; and collecting an array of pixel samples from at least one of the calibration sheets according to a set of pixel sampling rules to generate at least one reference sample array;
a scanner for capturing an image of a set of physical sheets generated from the set of calibration sheets;
the sampling module also: collecting an array of pixel samples from at least one of the imaged physical sheets according to the set of pixel sampling rules to generate at least one post-processing sample array; and
a comparison module, operated by a processor, for comparing the post-processing sample array to the reference sample array to determine if the two arrays have less than or equal to a predetermined number of differences,
wherein the comparison module is to:
in response to determining that the two arrays have less than or equal to the predetermined number of differences, identifying the set of physical sheets as the set of calibration sheets; and
in response to determining that the two arrays do not have less than or equal to the predetermined number of differences, identifying the set of physical sheets as not the set of calibration sheets.

17. The system of claim 16,
wherein a format of the calibration sheets is one from a group including: an electronic document format, logical format, a physical tangible format, and a RIP file format.

18. The system of claim 16,
wherein the physical sheets includes one from a group including: paper, cardstock, vellum, plastic;
wherein the physical sheets include one from a group including: text, photos, tables, pictures; and
wherein the physical sheets are collected into one from a group including: a set of physical sheets, a handout, a book, a pamphlet, a poster.

19. The system of claim 16, further comprising:
a set of sheet processing devices which generate the set of physical sheets by operating on the set of calibration sheets; and
wherein the sheet processing devices include one from a group of devices for: rendering, printing, routing, tracking, cutting, finishing, coating, sorting, collating, insertion, trimming, and binding, in accordance with a set of print production instructions in an "electronic job jacket".

20. The method of claim 19, further comprising:
a sheet management module for translating signals from the comparison module into feedback for managing the sheet processing devices such that subsequent processing of the physical sheets is in accordance with the set of print production instructions in an "electronic job jacket".

* * * * *

UNITED STATES PATENT AND TRADEMARK OFFICE
CERTIFICATE OF CORRECTION

PATENT NO. : 8,760,670 B2  
APPLICATION NO. : 12/572131  
DATED : June 24, 2014  
INVENTOR(S) : Robert Ulichney et al.

Page 1 of 1

It is certified that error appears in the above-identified patent and that said Letters Patent is hereby corrected as shown below:

In the Claims

In column 10, line 50, in Claim 1, delete "redetermined" and insert -- predetermined --, therefor.

In column 10, line 54, in Claim 1, delete "redetermined" and insert -- predetermined --, therefor.

In column 12, line 31, in Claim 15, delete "redetermined" and insert -- predetermined --, therefor.

In column 12, line 35, in Claim 15, delete "redetermined" and insert -- predetermined --, therefor.

Signed and Sealed this
Twenty-eighth Day of October, 2014

Michelle K. Lee
*Deputy Director of the United States Patent and Trademark Office*